United States Patent [19]
van der Schoot

[11] 3,980,147
[45] Sept. 14, 1976

[54] ARTICLE WEIGHT GRADING APPARATUS

[75] Inventor: Jelle van der Schoot, Aalten, Netherlands

[73] Assignee: Staalkat B.V., Aalten, Netherlands

[22] Filed: Oct. 6, 1975

[21] Appl. No.: 620,044

[52] U.S. Cl. ............................. 177/48; 177/229; 177/DIG. 5; 177/DIG. 6; 209/121
[51] Int. Cl.² ...................... G01G 3/08; B07C 5/18; A01K 43/08
[58] Field of Search ............ 177/229, 230, 212, 48, 177/47, 46, DIG. 6, DIG. 5; 209/121

[56] References Cited
UNITED STATES PATENTS

| | | | |
|---|---|---|---|
| 2,080,446 | 5/1937 | Templeman | 177/48 |
| 2,694,566 | 11/1954 | Wolter | 177/212 |
| 3,068,948 | 12/1962 | Mulvany et al. | 177/224 |
| 3,266,586 | 8/1966 | Reading et al. | 177/229 X |
| 3,390,733 | 7/1968 | Takahashi | 177/212 X |

*Primary Examiner*—Joseph W. Hartary
*Attorney, Agent, or Firm*—Cushman, Darby & Cushman

[57] ABSTRACT

Weighing apparatus for grading articles such as eggs and the like according to their weight. The apparatus comprises a tray, and a pair of leaf springs for mounting the tray for up and down movement and operatively connected to the tray and a support member, and being deflectable generally downwardly relative to the support member a first distance responsive to article weight. A stop is provided for allowing downward deflection of the tray relative to the support only to a second distance, which is normally less than the first distance. An out-of-round cam or the like changes the relative position of the stop and the support member so that the second distance approaches the first distance, and electrical contacts, photoelectric apparatus, or the like, are provided to sense when the second distance is substantially equal to the first distance.

10 Claims, 6 Drawing Figures

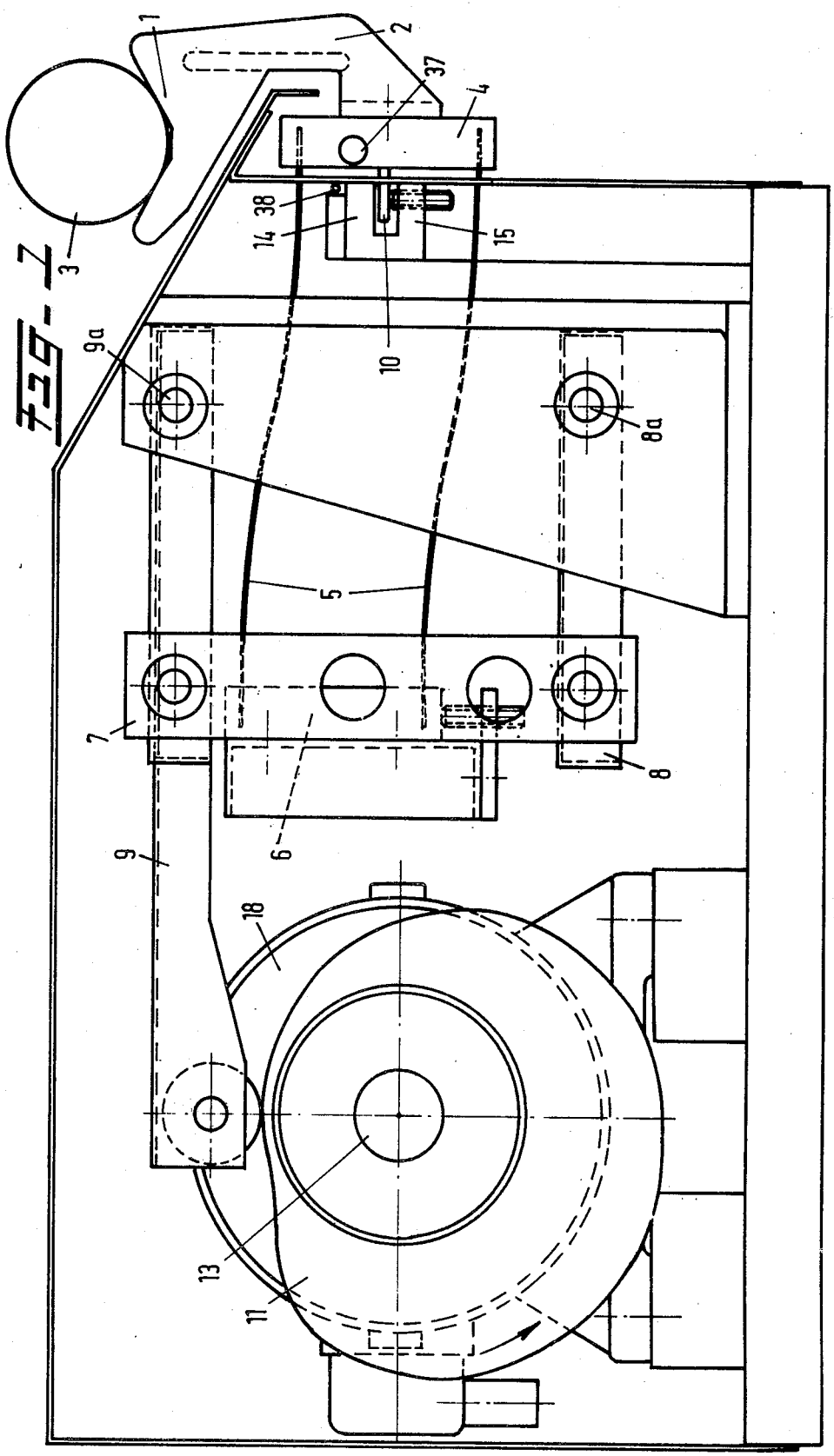

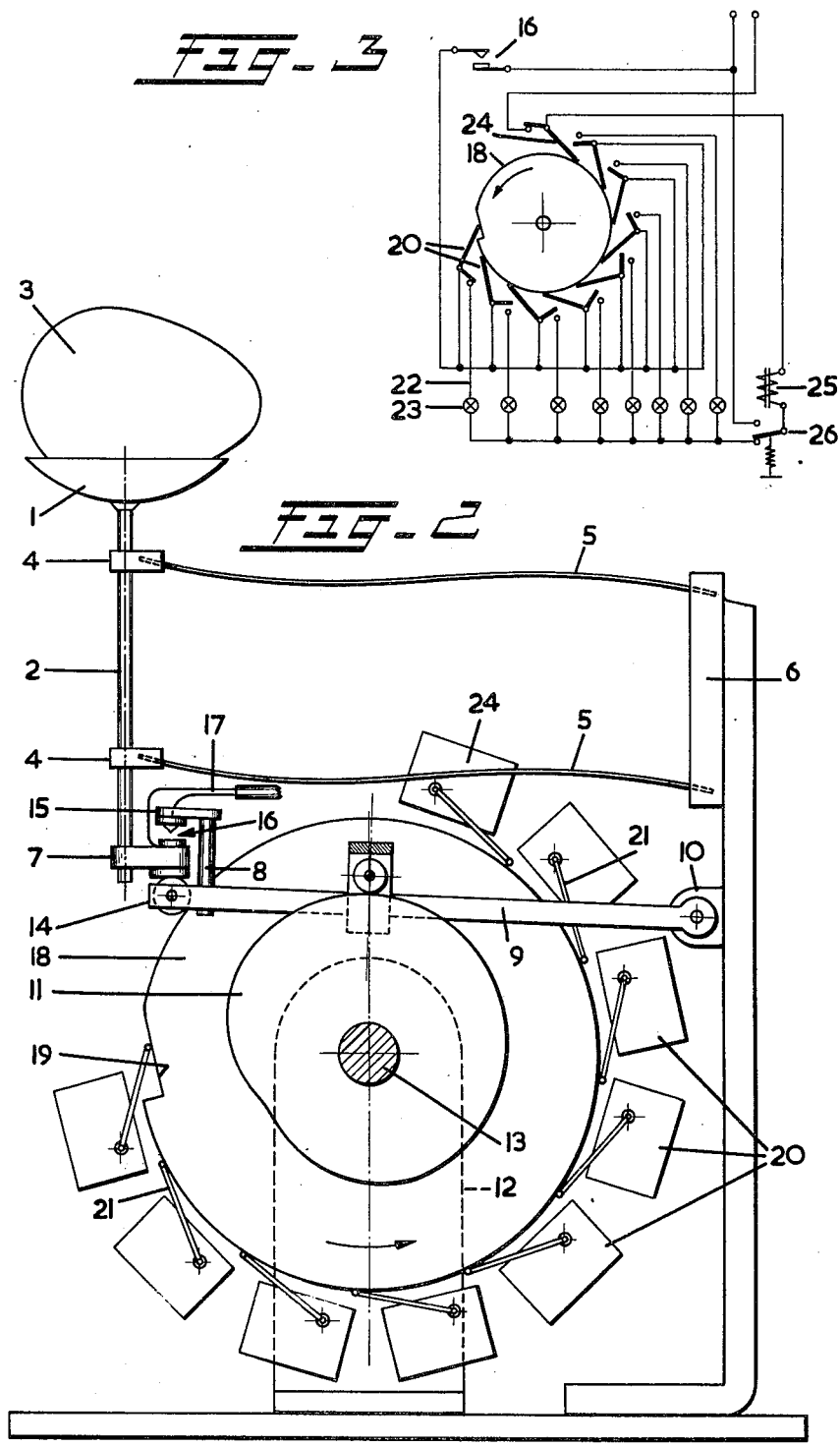

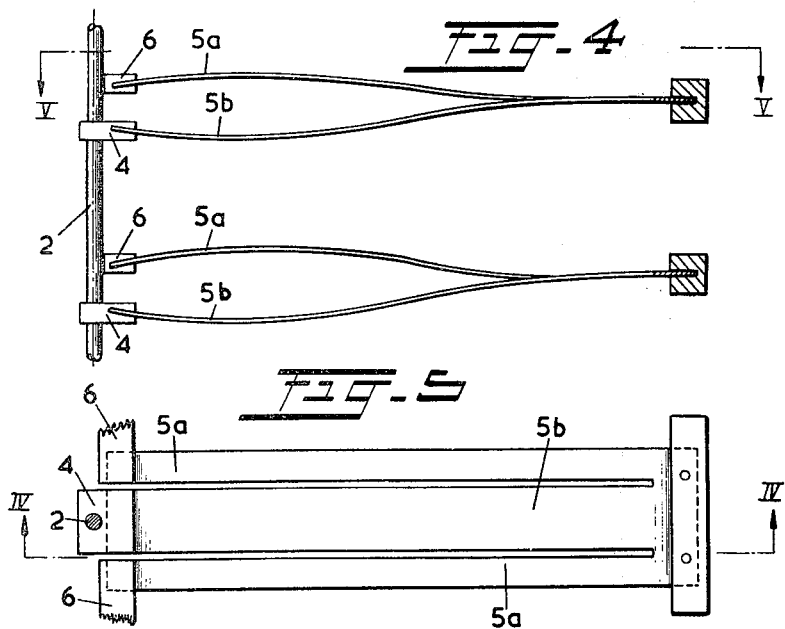
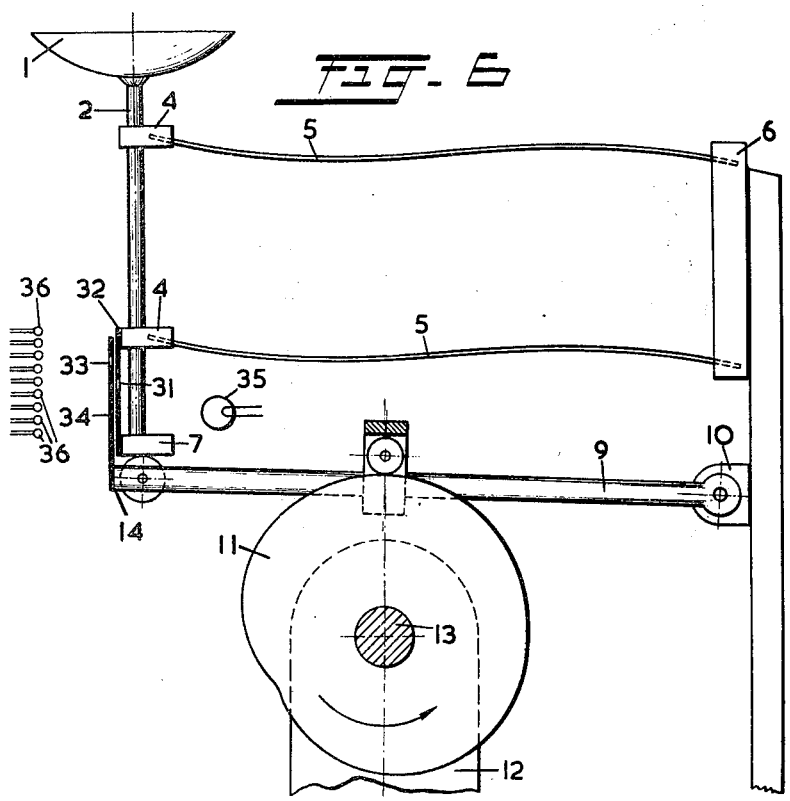

ARTICLE WEIGHT GRADING APPARATUS

BACKGROUND AND SUMMARY OF THE INVENTION

The invention relates to a weighing apparatus for grading articles such as eggs, tomatoes and the like according to their weight class, which apparatus includes a tray member movable under the load of an article a distance dependent on article weight, and means for sensing the deflected distance to determine the article's grade.

In a similar apparatus known from Dutch patent application No. 65,01016 each weighing apparatus determines exclusively whether a certain weight is exceeded. In this connection each time a number of weighing apparatus is arranged one behind the other and the article has to be weighed by one or more weighing apparatuses depending on its weight till it reaches the weighing apparatus which tips by the weight of the article, after which said article is moved away. Furthermore, in this prior apparatus for producing the resetting force use is made of spring plates which are relatively rigid in order to achieve rapid weighing, which rigidity is objectionable in that no accurate weighing is obtained.

Other prior art structures are shown in U.S. Pat. Nos. 3,068,948 and 3,390,733 (see FIGS. 3, 6 and 8 in particular). While such structures are useful for grading articles such as eggs and the like, they normally require a large number of moving parts, and a complicated structural arrangement. According to the present invention, on the other hand, a greatly simplified apparatus is provided for performing the same ultimate function.

According to the present invention, a tray for receiving an article is mounted for generally up and down movement by a plurality of leaf springs operatively connected to the tray and a stationary support, which leaf springs, in addition to mounting the tray for movement, also provide a restoring force that is load dependent — that is the leaf springs allow deflection of the tray a first distance dependent upon the weight of the article received thereby. The provision of a single means to provide both these functions eliminates a large amount of the cumbersome apparatus inherent in prior art devices, while still allowing the ultimate grading function to be performed just as well.

The tray will, if not restricted, deflect downwardly a first distance in response to the load thereon. In order to provide for grading of the article, however, means are provided for allowing generally downward deflection of the tray relative to the support member for the leaf springs only to a second distance, normally less than the first distance. Such means may be in the form of a stationary or a movable stop. Means are provided for gradually changing the relative position of the stop and the support member so that the second distance approaches (and ultimately surpasses) the first distance. Such means preferably take the form of an out-of-round cam or the like. A cam follower for the cam is operatively connected to the support or the stop, and in response to rotation of the cam, provides for relative movement therebetween. Means are also provided for sensing when the second distance is substantially equal to the first distance, such as electrical contacts or photoelectric apparatus.

When the first distance substantially equals the second distance, the sensing means is actuated, and additionally other means may be actuated for recording the position of the cam at the time the second distance substantially equals the first distance for determining the grade of the article. Dependent upon the grade so sensed, the article may then be passed on to one of a number of separate storage or grading bins, packing apparatus, or the like. Other means, such as an electrical interlock, can also be provided to insure that the cam position recording means is actuated only once during each complete weighing cycle, or complete revolution of the cam.

It is the primary object of the present invention to provide a simplified apparatus for article weight-grading. This and other objects of the invention will become clear from an inspection of the detailed description of the invention, and from the appended claims.

BRIEF DESCRIPTION OF THE DRAWINGS

FIG. 1 shows schematically a weighing apparatus used in a grader according to the invention;

FIG. 2 shows a second embodiment of such an apparatus;

FIG. 3 is a schematic of the electric contacts and connections used in the apparatus shown in FIG. 2;

FIGS. 4 and 5 show an alternative embodiment of the balance springs in side elevational and in plan view; and FIG. 6 shows schematically a third embodiment of a weighing apparatus used in a grader according to the invention.

DETAILED DESCRIPTION OF THE INVENTION

In the drawings each weighing apparatus comprises a tray 1 mounted on top of a vertical tube 2, on which tray an article to be graded, for example an egg 3, a tomato or a fruit can be placed either by hand or by mechanical supply means. In the conventional supply of eggs to be graded in groups of six, for example six of these weighing apparatuses can be arranged in juxtaposed relationship transverse to the direction of supply.

Attached to the upright tube 2 is a block 4 in which the ends of two leaf springs 5 are mounted, for example by cementing. The leaf springs 5 extend approximately horizontally and parallel to each other and are attached with their other ends in a similar way and at the same distance with respect to each other to a support member 6. The leaf springs 5 mount the tray 1 for generally up and down movement relative to support member 6, and also provide a restoring force dependent upon the weight of the article 3 disposed on the tray 1, being displaceable a first distance dependent upon the article 3 weight. The support member 6 is mounted for vertical adjustment on a parallel guide 7 which can possibly move along substantially horizontally extending arms 8 and 9, the ends of which are each time rotatably suspended in points 8a and 9a, respectively.

Alternative embodiments of the suspension of the tray 1 with its tube 2 are shown in FIGS. 2, 4 and 5.

In the apparatus shown in FIG. 2 there are provided on tube 2 two small blocks 4 superposed at some distance from each other, in each of which blocks the end of a leaf spring 5 is mounted. Leaf springs 5 are attached with their other ends to a fixed support member 6. As shown in the drawings, the springs 5 are clamped at a slight angle to the vertical in such a manner that the attachment of each spring 5 to the block 4 is higher in the unloaded condition of the tray and equally high when the tray is loaded with an article of average weight, as the attachment of said spring to the support member 6. Consequently, when the tray 1 sags under the weight of an article 3 to be graded, the horizontal displacement of the tube 2 will be as little as possible.

In the embodiment shown in FIGS. 4–5 each spring 5 comprises a strip of spring steel in which two longitudinal incisions are made, as a result of which said strip is divided over the greater part of its length into a first separate flexible strip portion 5b located in the center between two second strip portion 5a. The strip portions 5a are attached with their free ends to two fixed supports 6 on both sides of tube 2, while strip portion 5b is attached to a block 4. The other ends of the three strip portions form a whole and may be somewhat rigidified by providing them with a metal strip, if desired. Owing to this construction of the balance suspension, horizontal displacements of the tube 2 are even more strongly prevented during sagging of the balance.

Reverting to FIG. 1 it appears that the arm 9 rests with the end opposite to its fixed pivot 9a on the curved cam surface of an eccentric and/or out-of-round cam 11, which can rotate with a shaft 13 supported for rotation in stationary bearings 12, the arrangement being such that when the cam 11 rotates the arm 9 resting thereon and consequently also the parallel guide 7 is moved gradually upwardly from a lowest position.

If the tray 1 is loaded by an article 3, a projection 10 mounted on one side of the block 4 will rest on the frame of the two legs 14 and 15 of a fixed U-shaped member in the lower positions of the arm 9, as a result of which the balance will not further sag by the weight of said article than is permitted by the position of the arm 9 and of the cam 11. Upon rotation of the cam 11 and consequent upward movement of the arm 9, the parallel guide 7, the springs 5 and the block 4 there will be reached a state in which the tensile force of the springs 5 exercises an upward force on the block 4 exceeding the weight of the tray 1 and of the article 3 lying thereon. The sagging of the tray and the block 4 will then no longer lag behind the rise of the arm 9, and the projection 10 will then be released from its stop on the lower leg 15 of the fixed U-shaped member and instead thereof come into contact with the upper leg 14 thereof, while the electric contacts arranged on the upper surface of the projection 7 or on the lower surface of said upper leg 14 will come into electric contact-making contact. That is, the stop 15 allows deflection of the tray 1 relative to the support 6 only a second distance, less than the first distance that the tray would deflect under the weight of the article 3 if not restricted. The contacts are formed here by a permanent magnet 37 mounted in the block 4 and a Reed switch 38 cooperating therewith.

On the shaft 13 there is also mounted a disc 18 which serves to determine the angular position of the cam 11 at the moment when the electric contact is made. The determination of the angular position can take place in various ways. Thus, for example, the disc 18 may be constructed as an apertured disc and cooperate with a photoelectric cell. Another possibility appears from the embodiment shown in FIGS. 2 and 3.

In the latter embodiment the tube 2 has on its lower end a projection 7 extending laterally between the superposed legs 14, 15 of a fork 8 mounted on the end of a substantially horizontally extending arm 9, which at its other end is pivotally suspended from a fixed support 10. The central part of the arm 9 rests on the curved cam surface of an eccentric and/or out-of-round cam 11, which can rotate with a shaft 13 rotatably supported in fixed bearings 12, the arrangement being such that upon rotation of the cam 11 the arm 9 resting thereon and its fork 8 will gradually move downwardly from a highest position.

If tray 1 is loaded by an article 3 of average weight, projection 7 will rest on the lower leg 14 of fork 8 in the higher positions of arm 9, as a result of which the balance will not deflect further in response to the weight of said article 3 than a second distance which is permitted by the position of arm 9 and of cam 11. Upon rotation of cam 11 and consequent downward movement of arm 9 and of tray 1 resting on the leg 14 of the fork 8, however, this second distance approaches the first distance until they are substantially equal and where the tensile force of the springs 5 on the tube 2 exercises an upward force exceeding the weight of the tray 1 and of the article lying thereon. The sagging of the tray and of its tube will then lag behind that of arm 9, and projection 7 will then be released from its stop on the lower leg 14 of the fork or L-shaped member 8 and instead thereof come into contact with the upper leg 15 of said fork, while the electric contacts of the pair of contacts 16 arranged on the upper surface of projection 7 or on the lower surface of said upper leg 15 will come into electric contact-making contact. In this case, the contacts of said pair of contacts 16 include suitable connections with fixed guides influencing the movements of tube 2 of arm 9 as little as possible, as is shown at 17.

Also here a disc 18 is mounted on shaft 13, which disc is provided at its periphery with a recess 19, along which periphery a number of microswitches 20, each pressed by a spring to the closed position, are fixedly arranged, the operating arm 21 of which microswitches slides along the periphery of said disc 18; these switches 20 are kept in the open position by their operating arm 21 till said arm 21 passes the recess 19, during which the respective switch 20 is temporarily closed and subsequently opened under the influence of its spring, which for each switch 20 is accompanied with the passing of cam 11 and of arm 9 of a very specific angular interval.

There may be as many of such microswitches as the number of weight classes, for example eight, between which the grader must be able to distinguish, which microswitches 20 are connected in parallel to each other and in series with the pair of contacts 16. These microswitches 20, each added to one weight class, and the recess 19 on the disc 18 are so constructed and arranged that during rotation of the shaft and the cam 11 and the disc 18 mounted thereon each microswitch is successively closed approximately when microswitch 20, preceding same in the direction of rotation, is opened again, so that constantly one and not more than one microswitch 20 being in the closed position for passing an electric current is series connected to the pair of contacts 16.

When the sagging of tray 1 and its tube 2 lags behind that of arm 9 and consequently the pair of contacts 16 closes in a position of said arm 9 in which a very specific microswitch 20 is closed, this indicates that the article 3 resting on the tray 1 belongs to the weight class to which this microswitch 20 is added. In that case an electric current flows through the line 22 to which this particular microswitch 20 is connected, as a result of which a relay or some other device 23 is energized which performs or initiates the operations that have to take place for the graded article to attain the destination of articles of the weight class to which it has appeared to belong during grading, after having been transported further together with the group of six ungraded articles to which it belonged.

That destination may be, for example, a packing machine for articles of this weight class, but may also be, for example for articles of inferior weight, a device for immediately processing such articles. The apparatus according to the invention renders it possible that the paths leading to their respective destinations, along which articles which have belonged to the same group of ungraded articles have to reach said destination, only part in a place or in places which is or are relatively remote from the grader. The electric pulses given by the apparatus and determining their weight class travel with them via an electric cable, including a separate cable core for each weight class.

When applying the invention in combination with the conventional graders the out-of-round cam can preferably be driven uninterruptedly in synchronism with the means for supplying the articles, in such a manner that when an article is supplied to the tray, the out-of-round cam is in the position in which the slightest tipping of the tray is permitted, which permitted tipping will afterwards gradually increase by rotation of the cam. However, it is also possible to drive the out-of-round cam by means of a separate electric motor which is energized as soon as an article is placed on the tray and is stopped after the cam has performed a full revolution, or which motor runs continuously and in synchronism with the supply.

A rapid-action switch 26 serves to open the circuit including the pair of contacts 16 and the microswitches 20 as soon as a current has passed through the circuit, as a result of which one of the relays or devices 23 has been energized. As soon as an electric current passes the coil 25 of this switch, said switch 26 will take its highest position, as a result of which the circuit 16, 20, 22, 23 is broken, but the coil 25 remains energized. This prevents re-energization of this or of other relays 23, e.g., when subsequently other microswitches to be passed yet by the recess 19 are closed, after via one of the microswitches 20 the associated relay 23 has become energized.

The circuit of coil 25 of switch 26 leads through a separate microswitch 24 provided for the purpose, of which, in contrast to the remaining microswitches 20, the contacts are closed in the normal position, and under the influence of the switch spring of said switch are only opened when the recess 19 in the disc 18 passes along the switch arm of this switch 24, which takes place after a completed revolution of the out-of-round cam 11. Coil 25 of switch 26 is thereby deenergized, thereby causing said switch to assume again its lowest position in which the circuit 16, 20, 22, 23 becomes available again for energizing a relay 23, as soon as afterwards for the first time again the pair of contacts 16 arrives in current-passing condition simultaneously with one of the microswitches 20.

As the apparatus is such that exclusively said relay 23 can be energized to which current is applied for the first time via the pair of contacts 16 and the associated microswitch 20, any wobbling of the balance, as a result of which the pair of contacts 16, after having been opened again, could be closed for a second, third or fourth time, will not further influence the operation of the apparatus.

Instead of the microswitches 20 use can also be made of photoelectric cells to which, for example, light can be emitted by a light beam moving along with the cam 11. Also the pair of contacts 16 can be replaced by a photoelectric cell, if desired.

In the third embodiment of the apparatus according to the invention shown in FIG. 6 and largely corresponding with the embodiment shown in FIG. 2, the series connection of a pair of contacts responding to the lagging of the tray-tipping and a series of microswitches responding to the position of the out-of-round cam are replaced by an optical series connection of means capable of passing or not passing a light beam.

To this end a first screen or plate 32 having an opening 31 is arranged on tube 2 of tray 1, while parallel to said screen a second screen or plate 34 having an opening 33 is provided on the free end of arm 9. In front of these screens 32, 34 there is a fixed light source 35, while behind said screens a vertical series of photoelectric cells 36 is positioned, of which each cell is added to a specific weight class, the arrangement being such that the light source, the openings 31 and 33 and the vertical series of cells 36 are in the same vetical plane.

The arrangement is furthermore so constructed that so long as tube 2 rests with its lower end 7 on arm 9, openings 31 and 33 are not aligned with the light source 35, while when the tipping of the tray 1 lags behind the position of the arm 9 determined by the cam 11, there will be at least one moment in which this will be indeed the case, and a light beam is passed, which will hit the series of photoelectric cells 36; the position of opening 33 in screen 34 mounted on arm 9 determines what particular cell of the series will be hit by the light beam. To avoid that in case a photoelectric cell would be hit by a light beam for the second time, for example through wobbling of the balance, again a, this time incorrect signal would be emitted, the photoelectric cells 36 are so arranged that only the signal of the cell first hit by the light beam is passed, which can be effected, for example, by means of a switch as described above with respect to the relay 23.

It is also possible to connect all photoelectric cells 36 belonging to the series in parallel in the same circuit, so not each cell added to a specific weight class, but by each cell hit by a light beam a pulse is given in said circuit, the number of pulses being decisive of closing the circuit, as a result of which the actions to be performed with articles of the class are initiated in accordance with the weight class to which the article belongs. To effect this it is necessary that after the tipping of the tray has once lagged with the movement of the arm, a light beam will constantly be passed, as a result of which a number of photoelectric cells up to and including the lowermost will successively be hit. This is possible either by applying a fork 8 with an upper leg 15 restraining the relative movement of the tube 3 with respect to the arm 9, or by constructing the opening 31 as a vertical longitudinal slot. On the other hand, in that case the photoelectric cells will have to be of the type that acts slowly and exclusively responds to the first time that they are hit by a light beam and not to an immediately following darkening and to a second or third hit by an air beam.

While the invention has been herein shown and described in what is presently conceived to be the most practical and preferred embodiments of the invention, it will be apparent to one of ordinary skill in the art that many modifications may be made thereof within the scope of the invention, which scope is to be accorded the broadest interpretation of the appended claims so as to encompass all equivalent structures and devices.

What is claimed is:

1. A weighing assembly for grading articles such as eggs and the like dependent upon the weight thereof, said assembly comprising
 a tray for receiving an article thereon,
 means for mounting said tray for generally reciprocal up and down movement and for providing a restoring force dependent upon the weight of the tray, said means comprising a plurality of leaf spring members operatively connecting said tray and a support member, said tray being deflectable generally downwardly relative to said support member a first distance dependent upon the article weight,
 means for allowing generally downward deflection of said tray relative to said support member only to a second distance, normally generally less than said first distance, said means including a stop,
 means for gradually changing the relative position of said stop and said support member so that said second distance approaches said first distance, and
 means for sensing when said second distance is substantially equal to said first distance.

2. A weighing assembly as recited in claim 1 wherein said means for gradually changing the relative position of said stop and said support member includes an out-of-round cam.

3. A weighing assembly as recited in claim 2 wherein said means for gradually changing the relative position of said stop and said support member further includes a cam follower operatively connected to said stop.

4. A weighing assembly as recited in claim 2 wherein said means for gradually changing the relative position of said stop and said support member further includes a cam follower operatively connected to said support member.

5. A weighing assembly as recited in claim 3 wherein said means responsive to said second distance being substantially equal to said first distance comprises a first electrical contact formed on a portion of said tray for engaging said stop, and a second electrical contact operatively connected to said stop, said first electrical contact being disposed on an upper surface of said tray portion, and said second electrical contact being operatively connected to said stop by a generally L-shaped member, said second electrical contact being disposed above said first electrical contact and being adapted to come into contact with said first electrical contact when said second distance slightly exceeds said first distance.

6. A weighing assembly as recited in claim 3 wherein said means responsive to said second distance being substantially equal to said first distance comprises a first plate, having an opening therein, operatively connected to said stop, and a second plate disposed generally parallel to said first plate and having an opening therein, operatively connected to said tray, a light source disposed on one side of said plates, and a plurality of light-sensitive members disposed on the other side of said plates, said openings in said plates lining up and allowing passage of light therethrough from said source to said sensors when said second distance substantially equals said first distance.

7. A weighing assembly as recited in claim 2 further comprising means for recording the position of said cam when said means responsive to said second distance being substantially equal to said first distance is actuated.

8. An assembly as recited in claim 7 further comprising means for insuring that said means for recording the position of said cam when said means responsive to said second distance being substantially equal to said first distance is actuated, is actuated only once during each complete weighing cycle complete revolution of said cam.

9. An assembly as recited in claim 1 wherein each of said plurality of leaf springs includes a first portion operatively connected to said tray adjacent one end thereof, and operatively connected to a pair of second portions, one on either side of said first portion, at the other end thereof, and wherein said second portions are each connected at one end thereof to said first portion and to a first stationary member, and are connected at the other end thereof to a second stationary member, said first portion being generally of the same length as said second portions.

10. An assembly as recited in claim 1 wherein said leaf springs support said tray when no article is disposed thereon in a position vertically above the connection of said leaf springs to said stationary member.

* * * * *